(12) United States Patent
Kelly

(10) Patent No.: US 8,072,086 B2
(45) Date of Patent: Dec. 6, 2011

(54) ELECTRICAL ENERGY STORAGE AND RETRIEVAL SYSTEM

(76) Inventor: Samuel Thomas Kelly, San Marcos, CA (US)

( * ) Notice: Subject to any disclaimer, the term of this patent is extended or adjusted under 35 U.S.C. 154(b) by 232 days.

(21) Appl. No.: 12/566,501

(22) Filed: Sep. 24, 2009

(65) Prior Publication Data

US 2010/0072818 A1   Mar. 25, 2010

Related U.S. Application Data

(60) Provisional application No. 61/099,876, filed on Sep. 24, 2008.

(51) Int. Cl.
  *F04B 23/08* (2006.01)
  *F03D 9/02* (2006.01)
(52) U.S. Cl. .................. 290/1 A; 290/43; 417/199.2
(58) Field of Classification Search .......... 290/1 R, 290/1 A, 43, 44, 54, 55; 417/199.2, 200
   See application file for complete search history.

(56) References Cited

U.S. PATENT DOCUMENTS

| | | | |
|---|---|---|---|
| 4,237,692 A | | 12/1980 | Ahrens et al. |
| 4,324,983 A | * | 4/1982 | Humiston ............ 290/1 R |
| 4,380,419 A | | 4/1983 | Morton |
| 4,447,738 A | | 5/1984 | Allison |
| 6,023,105 A | | 2/2000 | Youssef |
| 6,135,721 A | * | 10/2000 | Hasbrouck ............ 417/120 |
| 6,224,344 B1 | * | 5/2001 | Hasbrouck ............ 417/120 |
| 6,224,345 B1 | * | 5/2001 | Dussault ............. 417/138 |
| 6,511,307 B2 | * | 1/2003 | Popov et al. .......... 417/514 |
| 6,692,234 B2 | * | 2/2004 | Muhs ................ 417/199.2 |
| 7,188,471 B2 | * | 3/2007 | Walters ............... 60/398 |
| 7,239,035 B2 | | 7/2007 | Garces et al. |
| 7,254,944 B1 | | 8/2007 | Goetzinger et al. |
| 2011/0042959 A1 | * | 2/2011 | Kelly ................. 290/55 |

* cited by examiner

*Primary Examiner* — Nicholas Ponomarenko
(74) *Attorney, Agent, or Firm* — Donn K. Harms

(57) ABSTRACT

A system and method to efficiently store and convert erratic wind and solar electrical energy production to a source of reliable standard AC electrical power by means of an electric motor operatively engaged to power a pump. The pump in a sealed communication with a reservoir cavity evacuates air from the cavity to store the generated energy as potential energy in the form of a pressure differential with ambient atmosphere. Regulated air inflow into the evacuated cavity is employed to drive a generator or alternator to produce electric power which is synchronized with grid demand and communicated to the grid.

20 Claims, 2 Drawing Sheets

US 8,072,086 B2

ELECTRICAL ENERGY STORAGE AND RETRIEVAL SYSTEM

This application claims priority from U.S. Provisional Application No. 61/099,876 filed on Sep. 24, 2008 and U.S. patent application Ser. No. 12/546,057 filed Aug. 24, 2008 both of which are incorporated herein in their entirety by reference.

BACKGROUND OF THE INVENTION

1. Field of the Invention

The disclosed device relates to energy storage. More particularly, the disclosure relates to a system and method for storing energy generated from natural sources such as wind and sun which have an energy generation output which is inherently variable. Through the employment of such natural energy production to generate and store negative air pressure, renewable energy from peak periods of production which may be mismatched to a minimized requirement of a power grid, may be stored and communicated to the grid as needed or to supplement periods of low generation by a solar array or windmill farm.

2. Prior Art

A longstanding vexation is the fact that the value of two prominent renewable energy sources is compromised by their irregular nature. Wind is inherently variable. Some days are windy, some are not, and even during a single day wind varies throughout the day. Consequently, a mismatch frequently occurs between potential energy available from low winds during periods of peak demand, and high winds during periods when the demands of the electrical grid may be low, such as in the evening. Further, due to the nature of wind farms being located distant to cities requiring energy, at times the power generated in wind farms can exceed the capacity of the transmission lines communicating the power to the grid requiring it. Unable to transmit the power generated during peak winds, frequently windfarms will idle turbines which could be producing electrical energy at a maximum rate.

Solar energy suffers its own constraints. First, solar energy is only produced during the day, which may be advantageous in the summer when consumer air-conditioning demands peak during the day. However, in other months of the year, the periods of peak demand are in the early mornings and evenings when little or no solar power is produced. Thus, energy on such solar farms available at mid day may go unused due to a lack of demand of the power grid. Additionally, solar energy farms also are frequently located a good distance from the power grids they serve and transmission lines can limit the amount of power that may be communicated from the solar generation facility to the distant grid. If transmission lines lack the capacity to transmit the full amount of power a solar generation facility can produce at mid day in bright sunlight, the energy can go to waste.

Means for cost effective power storage have long been sought to mitigate these problems and add value to the naturally generated and captured energy. Benefits of storage are significant, especially in integrating distributed generation. Energy storage provides potential energy which may be tapped to balance production with demand peaks and to deter the need for power transmission and grid upgrades.

Power storage devices in common use today are pumped-hydro, compressed air, flywheels, and batteries. Pumped-hydro storage as described in U.S. Pat. Nos. 7,239,035, 6,023,105, and 4,380,419 has played an important role in enhancing grid system stability for over a century, however wider use of pumped-hydro storage is limited by requiring sites with strong winds for power generation and access to vertically disparate water reservoirs. Compressed air energy storage is offered in many forms as exemplified in U.S. Pat. Nos. 7,254,944, 4,447,738, and 4,237,692 but requires means to compensate for diabatic thermal energy leakage which compromises this type of storage. Flywheels and batteries have specialized uses but neither can offer cost effectiveness for bulk energy storage as would be needed for grid-connected solar and wind farms.

Small renewable energy systems have been promoted to reduce farm, business, and domestic energy bills but complete independence from electric utilities would only be practical if there was a cost effective way to store a significant amount of power from peak generation periods, on site or nearby, to supplement power generated during minimal generation periods.

Further, current grids must maintain "peaker plants" to input energy during periods of high demand when the generation capacity to the grid is maximized. Such peaker plants are located throughout cities and energized during periods of high demand to keep the grid from overloading. However, they are noisy, and generally run by diesel engines which pollute and must have onsite supplies of fuel which must be maintained. A storage device allowing excess produced energy from the grid to simply be stored and injected back to the grid as needed which is small and non polluting would be a boon to such grid systems.

As such, there is an unmet need for an energy storage system that addresses the shortcomings and limitations of conventional energy storage systems. Such a system should allow wind generation systems to maximize energy production at all times of peak wind, no matter the demand for the energy or the transmission line capability. Such a system should also be adapted to store solar generated energy during peak sunlight periods irrespective of grid demand and transmission capability. Further, such a system should be sufficiently compact and low-tech to be deployable on a small farm or business or residential property to allow for energy storage during peak periods to supplement minimal production periods. Such a system should also be able to substitute for the conventional diesel or gas powered peaker plants most grids maintain.

The apparatus and method herein is adapted to overcome these shortcomings and meet these objectives. The system employs a contained negative pressure reservoir or vacuum which is generated in real time from the natural energy production facility, and allows for energy storage for future use. It is an easy to maintain system not requiring a high degree of technical expertise and well adapted for employment by large energy farms, smaller business and residential properties having onsite renewable energy generation.

In this respect, before explaining at least one embodiment of the herein disclosed energy storage apparatus and method of operation invention in detail, it is to be understood that the invention is not limited in its application to the details of construction and to the arrangement of the components set forth in the following description or illustrated in the drawings. The invention is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for designing other storage systems for renewable energy and for carrying out the several purposes of the present invention. It is important, therefore, that the claims be regarded as including such equivalent construction insofar as they do not depart from the spirit and scope of the present invention.

An object of this invention is the provision of such a storage system for wind energy or solar energy which does not require batteries or other electrical means for energy storage, yet will produce electrical energy as needed.

It is a further object of the invention herein, to provide such a renewable energy storage system which will allow windmill farms and solar energy generation facilities to operate more profitably by allowing for storage of energy produced during peak available generation periods for sale and use at times when grid requirements and/or prices are higher.

Yet another object of the invention herein is to provide such a renewable energy storage system and method, that is deployable on a small scale such as on ranches and residential properties having windmills and solar generation to provide a means to even out energy production with usage over a period of time.

A further object of this invention is to provide means to store unreliable intermittent power to increase its usefulness and value.

Another object of the invention herein is the provision of a cost effective in kilowatt-hour storage capacity.

An additional object of the disclosed invention is the provision of such an energy storage facility which may be readily constructed with low cost concrete and can be sited anywhere with access to grid transmission lines.

A further object of the invention herein disclosed is that it may be continually upgraded to be sized as needed and which is effective for both long term and short term energy storage.

Yet a further object of the disclosed device and method for energy storage herein is that it is not subject to thermal energy loss.

Yet another object of this invention is the provision of a means to store excess produced electricity from normal grid generation plants and feed it to the grid when peak demand requires and thereby replace expensive and polluting peaker plants.

Finally, yet another object of the invention herein is a mode of energy storage that may be easily adapted to non manmade structures for negative pressure containment in the form of terrestrial cavities such as mines, wells and caverns.

These together with other objects and advantages which will become subsequently apparent reside in the details of the construction and operation as more fully hereinafter described and claimed, reference being had to the accompanying drawings forming a part thereof, wherein like numerals refer to like parts throughout.

SUMMARY OF THE INVENTION

The invention is described here in a general form, and those skilled in the art, upon reading this disclosure will surely see deviations and tangents to the disclosure which may be advanced. All such alterations are considered to be within the scope of this invention.

Further, the device and method herein is not intended to be restricted to a particular energy source or application to store any particular energy source. As such it is meant to associate with and support various energy gathering and power transporting systems, such as wind and solar farms and to augment the capacity of grid transmission lines through an increase in available time for transmission of generated energy.

Further, specifics of capacity, construction, and component arrangement are detailed for illustrative purposes only. For instance it would be apparent to one skilled in the art that this system could be configured so that the pump and generator are combined as a unit to run forward for energy storage and run in reverse for energy retrieval.

The device and method herein, as noted provide a simple storage system that may be easily enlarged in capacity by the enlargement of vacuum or negative pressure storage volume. It will thus work well with renewable but disparate in production electrical energy sources like solar and wind plants as well as provide a substitute for diesel and gas powered peaker plants conventionally used to supplement grid energy supplies.

An example;

Consider a concrete cylinder 50 meters in diameter by 500 meters in length with hemispheric ends. Then volume equals $\pi r$ squared times length plus $\frac{4}{3} \pi r$ cubed.

Volume=1,047,197 cubic meters

Let working pressure range be 0.6 atm (−0.4 to ±1.0 atmospheres)

Then mean working pressure will be −0.7 atm

Atm=101325 pascals(Pa) Pa=newtons per square meter (N/mm)

Newton-meter=joule=watt-seconds (N−m=j=w−s)

Hour(h)=3600 seconds(s) kilowatt(kw)=1000 watts(w)

$$\text{Energy storage} = \frac{.6 \times 1047197 \text{ mmm} \times .7 \times 101325 \text{ N/mm}}{3600 \text{ s/h} \times 1000 \text{ w/kw}} = 12{,}379 \text{ kwh}$$

The system noted above operates to store negative air pressure, using energy input from an intermittent power source such as wind or solar which is subject to higher and lower energy generation rates dictated by natural conditions. As can be discerned, no control exists over the amount of energy generated by wind due to varying weather conditions and solar may be maximized one minute and minimized by cloud cover the next.

The energy storage in the form of contained negative air pressure is generated by a pump which is energized for operation by communicated electrical power or mechanical power derived from solar or wind, to evacuate the air from one or more airtight chambers. Evacuation of the air is accomplished by way of a forward porting to thereby establish a negative pressure differential with ambient atmosphere exterior to the storage chamber.

Secondary porting to atmosphere is controllably blocked by a valve means to thereby maintain the negative pressure in the chamber until such time as the stored energy is called for, such as peak grid demand times or to supplement energy generation during cloudy, dark, or becalmed weather.

Energy retrieval is provided through the controlled input of atmosphere through a valve which is signaled to open allowing atmospheric air to refill the evacuated chamber via a conduit communicating through and driving a generator to produce electrical power as required. Both the rate and duration of the provided electrical power may be metered by controlling the amount of airflow through the control valve.

In use, the device and method of operation employ a contained vacuum storage container which is in communication with a wind or solar generation facility. During peak energy production by the solar or wind farm, should the produced electric energy surpass demand on the grid or transmission line capability, the determined excess will be shunted to power the air pumps to evacuate the storage container or other sealed housing hosting the negative pressure.

Thereafter, should power production at the solar or wind or other renewable energy facility drop below transmittable demand, the negative pressure will become a power source for an air driven generator through which atmosphere is communicated to the storage container. A valve meters the flow and rate of the air into the container and through the generator or alternator to maximize energy generation. Energy farms employing the system will be able to provide power to buyers when prices peak, withhold it and store it when less profitable or when transmission is impractical due to lack of transmission line capacity. The system storage capacity is only limited by the size of the container for negative pressure which may be easily supplemented by additional sealed reservoirs which are placed in communication with each other. Even caves and other natural terrestrial voids may be employed if they will maintain the negative pressure over time.

With respect to the above description and following detailed specification, it is to be realized that the optimum dimensional relationships for the components of the invention, to include variations in size, materials, shape, form, function and manner of operation, assembly and use, are deemed readily apparent and obvious to one skilled in the art, and all equivalent relationships to those illustrated in the following drawings and as described in the specification, are intended to be encompassed by the present invention. Therefore, the foregoing summary and description and following detailed description are considered as illustrative only of the principles of the invention.

Further, upon reading the disclosure herein, numerous modifications and changes based on the invention herein will readily occur to those skilled in the art. It is not desired to limit the invention to the exact construction and operation shown and described herein, and accordingly, all suitable modifications and equivalents which may occur to those skilled in the art are considered to fall within the scope of the invention.

BRIEF DESCRIPTION OF DRAWING FIGURES

DETAILED DESCRIPTION OF THE PREFERRED EMBODIMENTS OF THE INVENTION

Figure 1:
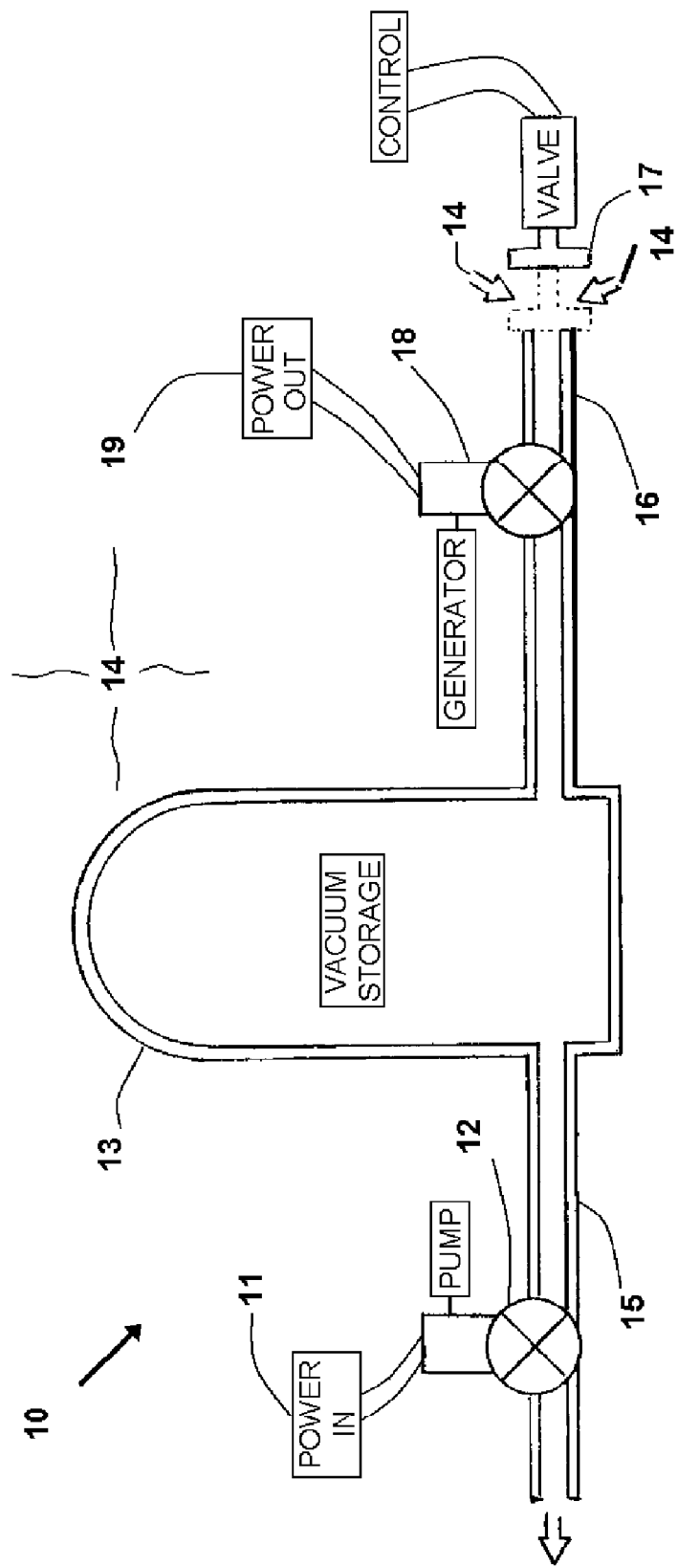
FIG. 1 is a diagram of the energy storage system depicting an unregulated power source, a pump, an airtight chamber, a generator, a power output, a control valve, and porting connecting the elements.
Figure 2:
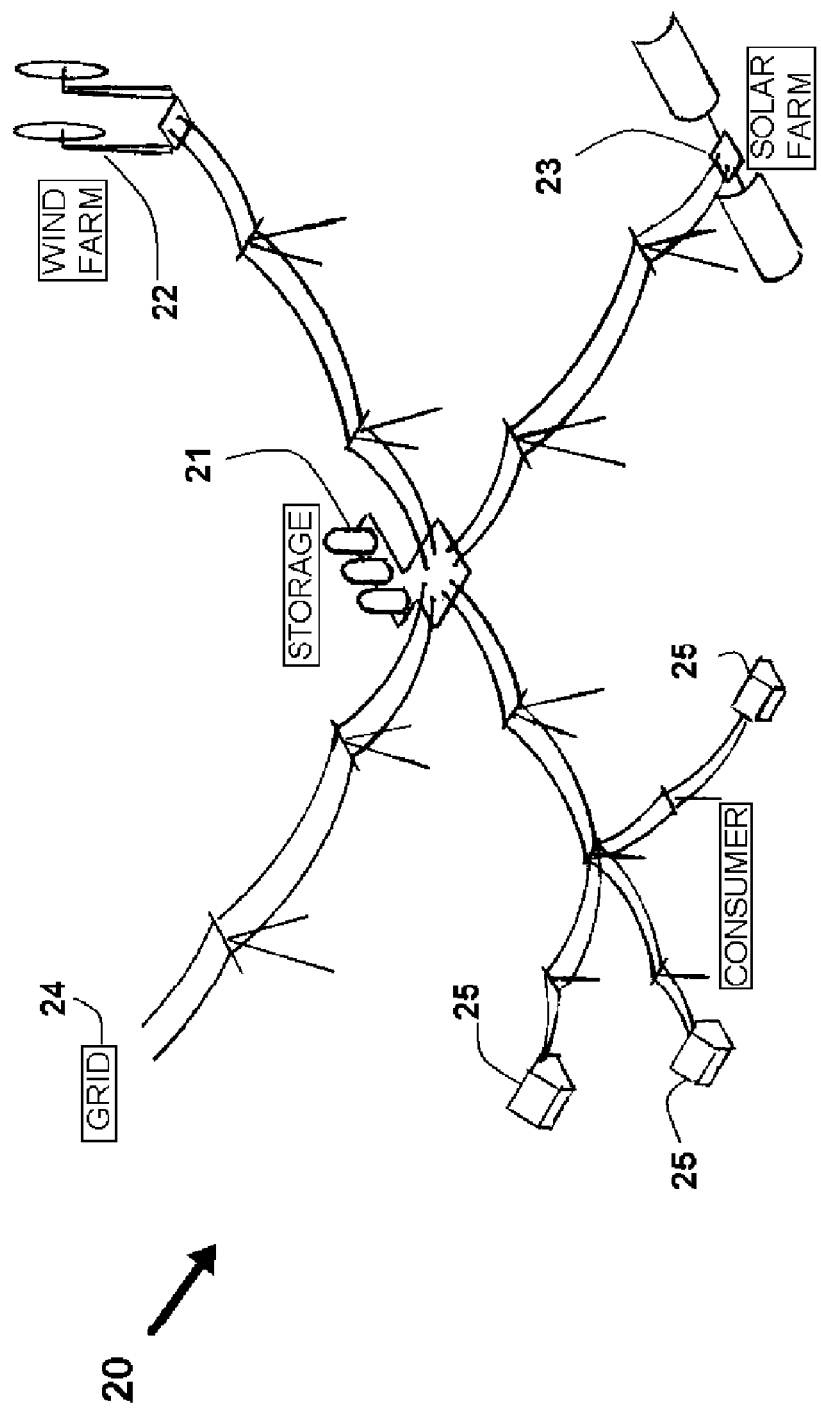
FIG. 2 is a diagram depicting a partial power grid including a wind farm, a solar farm, power consumers, a main grid connection, a power storage tank facility, and connecting power lines.

Referring now to the drawings, the device and method herein is shown in FIGS. 1-2 wherein similar parts are identified by like reference numerals.

There is seen in FIG. 1 an illustration of a typical contained vacuum energy storage system 10 according to the disclosure herein and generally designated by reference numeral 10. The system 10 operates on power communicated from a renewable or intermittent power source 11 which is subject to higher and lower energy generation rates which are dictated by natural conditions such as wind generated power or solar generated power. As can be discerned, no control exists over the amount of energy generated by wind due to varying weather conditions and solar may be maximized one minute and minimized by cloud cover the next. Power generated by such facilities thus is literally subject to the whims of the weather.

A prime component of the system 10 is a pump 12 for evacuation of atmosphere from an airtight chamber 13 communicating with the intake on the pump 12. The pump 12 is energized by the input power 11 and runs in a conventional fashion to evacuate the air from one or more communicating airtight chambers 13 by way of a forward porting 15 to establish a negative pressure differential with ambient atmosphere 14.

Secondary porting 16 to communicate the chamber 13 with exterior atmosphere 14 is prevented by a valve 17 to maintain the negative pressure in the chamber 13 until stored energy is required for power generation.

When needed to supplement real time production, or to provide power during times of non production such as at night on a solar energy farm, potential energy from the negative pressure in the chamber 13 is retrieved when valve 17 is signaled to open allowing communication of atmospheric air 14 into the evacuated chamber 13 via a port 16 which communicates first through an electrical generation means 18 such as a generator or alternator to produce electrical power for use and communication as required in real time. As noted the system may also be employed in place of peaker plants conventionally used by power grids to supply peak energy requirements of the grid which exceed local available supplies. In such a deployment it would simply be operatively engaged in a similar fashion to store excess energy during low periods of grid demand and to supply it back to the grid during peak demand times.

FIG. 2 depicts a figurative representation 20 of a field application wherein the contained vacuum storage 21 is networked with a wind farm 22, a solar collector farm 23, the general power grid 24, and consumers 25, to collect and store excess or low value energy when supply peaks and demand is low. The energy stored as negative pressure is then employed at a later time when prices are higher, or demand is higher, thereby maximizing both the gross deliverable energy production and profit of the facilities by allowing the storage and release of higher value energy into the system when demand is high and supply is low.

While all of the fundamental characteristics and features of the energy storage system and method have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An energy storage system for storing energy from wind, solar or other electrical energy generation sources, comprising:
   a sealed reservoir cavity adapted to maintain a pressure differential with ambient atmosphere exterior to said cavity;
   a pump having an intake port in sealed engagement with said reservoir cavity and having an exhaust port exterior to said cavity;
   electrically powered means to power said pump during an operative state;
   said pump in said operative state causing an evacuation of air from said reservoir cavity through said intake port, thereby creating an increase in said pressure differential;

means for rotation of an electrical generator or alternator, employing a force of air communicating through an inflow to said reservoir during a generation state; and said generator or alternator generating electricity during said generation state, whereby electrical power produced during said operative state is stored as potential energy as said pressure differential in said reservoir cavity for an employment to power said generator or alternator to generate an output of said electricity during said generation state.

2. The energy storage system of claim 1 additionally comprising: means to control said inflow of air into said reservoir, whereby a level of said output of electricity produced by said generator or alternator can be controlled.

3. The energy storage system of claim 1 additionally comprising: a check valve positioned as a means to prevent atmospheric air from entering said reservoir cavity by way of said pump when not in said operative state.

4. The energy storage system of claim 2 additionally comprising:
a check valve positioned as a means to prevent atmospheric air from entering said reservoir cavity by way of said pump when not in said operative state.

5. The energy storage system of claim 2 additionally comprising:
a controller means disposed to sense the electrical parameters of an accessible power line transmitting said electricity to an electrical grid and regulate said means to control said inflow to said reservoir cavity during said generation state thereby providing a means to regulate said output of said electricity so as to provide a matching of said electrical parameters to said electricity when communicated to said power line.

6. The energy storage system of claim 4 additionally comprising:
a controller means disposed to sense the electrical parameters of an accessible power line transmitting said electricity to an electrical grid and regulate said means to control said inflow to said reservoir cavity during said generation state to thereby providing a means to regulate said output of said electricity so as to provide a matching of said electrical parameters to said electricity when communicated to said power line.

7. The energy storage system of claim 1 additionally comprising:
said electrically powered means to power being an electric motor; and
said electric motor connected to a supply of electric energy during said operative state.

8. The energy storage system of claim 2 additionally comprising:
said electrically powered means to power being an electric motor; and
said electric motor connected to a supply of electric energy during said operative state.

9. The energy storage system of claim 5 additionally comprising:
said electrically powered means to power being an electric motor; and
said electric motor connected to a supply of electric energy during said operative state.

10. The energy storage system of claim 6 additionally comprising:
said electrically powered means to power being an electric motor; and
said electric motor connected to a supply of electric energy during said operative state.

11. The energy storage system of claim 7 additionally comprising:
said motor in a communication with a supply of electric energy generated by a solar powered or wind powered electrical generation facility having disparate generation capacity caused by weather during a peak production of said electrical energy, whereby said energy storage system provides a means to store electrical energy from generation sources which are unable to match grid demands due to unpredictable said generation capacity.

12. The energy storage system of claim 8 additionally comprising:
said motor in a communication with a supply of electric energy generated by a solar powered or wind powered electrical generation facility having disparate generation capacity caused by weather during a peak production of said electrical energy, whereby said energy storage system provides a means to store electrical energy from generation sources which are unable to match grid demands due to unpredictable said generation capacity.

13. The energy storage system of claim 9 additionally comprising:
said motor in a communication with a supply of electric energy generated by a solar powered or wind powered electrical generation facility having disparate generation capacity caused by weather during a peak production of said electrical energy, whereby said energy storage system provides a means to store electrical energy from generation sources which are unable to match grid demands due to unpredictable said generation capacity.

14. The energy storage system of claim 10 additionally comprising:
said motor in a communication with a supply of electric energy generated by a solar powered or wind powered electrical generation facility having disparate generation capacity caused by weather during a peak production of said electrical energy, whereby said energy storage system provides a means to store electrical energy from generation sources which are unable to match grid demands due to unpredictable said generation capacity.

15. The energy storage system of claim 7 additionally comprising:
said system operatively engaged to a power grid to communicate said electric energy to said grid during said generation state;
said system operatively engaged to said power grid to communicate said supply of electric energy to said electric motor during said operative state; and
said energy storage system thereby providing means to store said electrical energy communicated to said motor during said operative state, and to communicate said electrical energy back into said grid during said operative state as needed such as during periods of peak demand which exceeds a total electrical generation capacity communicable to said grid.

16. The energy storage system of claim 8 additionally comprising:
said system operatively engaged to a power grid to communicate said electric energy to said grid during said generation state;
said system operatively engaged to said power grid to communicate said supply of electric energy to said electric motor during said operative state; and
said energy storage system thereby providing means to store said electrical energy communicated to said motor during said operative state, and to communicate said electrical energy back into said grid during said operative state as needed such as during periods of peak demand which exceeds a total electrical generation capacity communicable to said grid.

17. The energy storage system of claim 9 additionally comprising:
   said system operatively engaged to a power grid to communicate said electric energy to said grid during said generation state;
   said system operatively engaged to said power grid to communicate said supply of electric energy to said electric motor during said operative state; and
   said energy storage system thereby providing means to store said electrical energy communicated to said motor during said operative state, and to communicate said electrical energy back into said grid during said operative state as needed such as during periods of peak demand which exceeds a total electrical generation capacity communicable to said grid.

18. The energy storage system of claim 10 additionally comprising:
   said system operatively engaged to a power grid to communicate said electric energy to said grid during said generation state;
   said system operatively engaged to said power grid to communicate said supply of electric energy to said electric motor during said operative state; and
   said energy storage system thereby providing means to store said electrical energy communicated to said motor during said operative state, and to communicate said electrical energy back into said grid during said operative state as needed such as during periods of peak demand which exceeds a total electrical generation capacity communicable to said grid.

19. A method of electrical energy generation and supply employing the energy storage system of claim 5 including the steps of:
   employing said controller means to sense the electrical parameters of an accessible power line transmitting said electricity to an electrical grid to determine its current capacity; and
   employing said means to regulate said means to control said inflow to said reservoir cavity to provide a matching of said electricity produced during said generation state and communicated to said power line to said capacity of said power line.

20. A method of electrical energy generation and supply employing the energy storage system of claim 9 including the steps of:
   employing said controller means to sense the electrical parameters of an accessible power line transmitting said electricity to an electrical grid to determine its current capacity; and
   employing said means to regulate said means to control said inflow to said reservoir cavity to provide a matching of said electricity produced during said generation state and communicated to said power line to said capacity of said power line.

* * * * *